Feb. 1, 1955   M. HOFER   2,700,966
VALVE DRIVE MECHANISM
Filed Oct. 19, 1953   2 Sheets-Sheet 1

INVENTOR
MAX HOFER

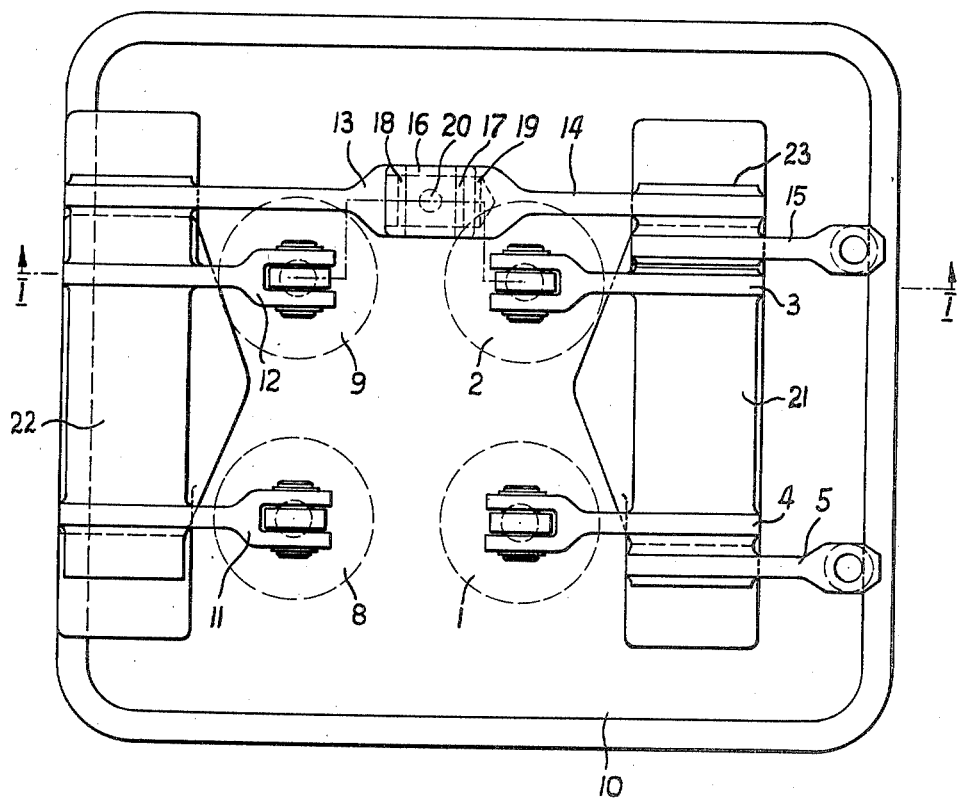

United States Patent Office 2,700,966
Patented Feb. 1, 1955

2,700,966

VALVE DRIVE MECHANISM

Max Hofer, Augsburg, Germany, assignor to Maschinenfabrik Augsburg-Nurnberg A. G., Augsburg, Germany, a corporation of Germany Application October 19, 1953, Serial No. 386,936

Claims priority, application Germany November 12, 1952

9 Claims. (Cl. 123—90)

This invention relates to lever linkage mechanism for producing a certain mechanical motion and more particularly to the cam actuated mechanism for intermittently opening inlet and outlet valves in an internal combustion engine.

In internal combustion engines having inlet and outlet valves arranged in the cylinder head, it may be desired to have both the inlet and outlet valves controlled and actuated from a single camshaft arranged along the side of the cylinder below the head. In such an arrangement, rocker arms may be mounted above the cylinder head to actuate the valves, one rocker arm pivoted on either side of the cylinder head. If it is desired to have but one camshaft besides the cylinder for all the valves, a pivoted lever linkage is arranged across the cylinder head for the operation of the rocker arms on the side of the cylinder opposite to the camshaft.

Since the components of such a lever linkage are pivoted more or less midway of the cylinder head and the outside ends of the levers rotate simultaneously about two parallel axes, binding in the center pivots through slight misalignment of the levers is possible unless extreme care is taken in the mounting and maintaining of the lever axes as well as the levers themselves in close tolerance aligned position.

According to this invention, however, such a valve actuating mechanism is constructed whereby the effects of slight misalignment of the levers and rocker arms, in assembly or in use, are compensated for by the joint between two oppositely pivoted levers comprising bearing elements of substantially semicircular cross-section meeting each other along a plane surface, with the axes of such bearing elements being substantially perpendicular to each other and with each bearing element carried in a substantially semicircularly sectioned race in its respective lever.

It is accordingly a principal object of this invention to provide, in valve actuating mechanism of the character described, a misalignment compensating joint between two oppositely pivoting rocker levers, which joint is free of binding forces, yet of a bearing configuration little susceptible to wear in use.

Another object of this invention is to provide between the ends of two oppositely pivoting rocker arms a bearing joint comprising bearing elements of substantially semicircular cross-section meeting each other along a plane surface and each freely rotating about its axis in a race.

A still further object of this invention is to provide in a construction of the character described a self-containing bipartite bearing arrangement which will retain itself in position during use without the necessity of separate means for retaining the bearings in their respective races.

A still further object of this invention is to provide a misalignment compensating pivoted joint between the coacting ends of two levers, which joint admits of free pivoting movement in one direction of the levers with respect to each other while compensating without binding for misalignment of the respective lever ends in another direction.

Still another object of this invention is to provide a pivoted bearing connection of the character described which maintains between two mutually pivoting lever ends a free and substantially frictionless engagement in one direction while also maintaining in other directions sliding play between the pivoted lever ends.

Other objects and advantages of this invention will be apparent from the following description, the accompanying drawings and the appended claims.

In the drawing—

Fig. 3 is a top plan view of a cylinder head having a construction embodying the invention.

Figure 1:
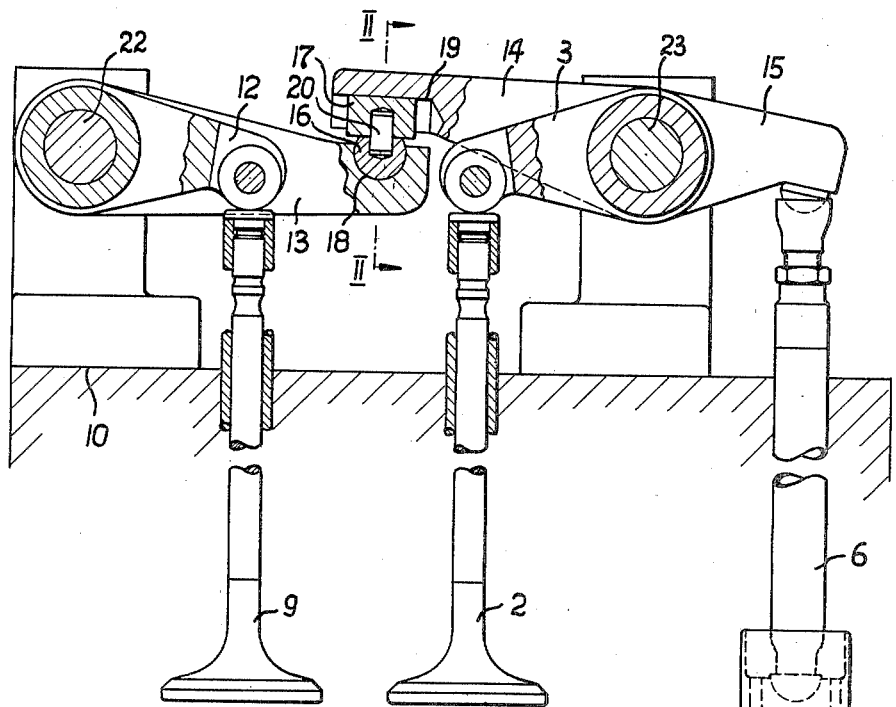
Fig. 1 is a side view partly in section along the line I—I of Fig. 3, of an internal combustion engine valve drive embodying the invention.
Figure 2:
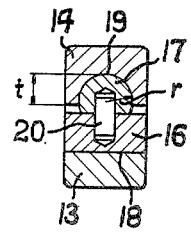
Fig. 2 is a section along the line II—II of Fig. 1.

Referring to the drawings, in which like reference numerals designate like parts throughout the several views thereof, the invention is shown as embodied in the valve actuating mechanism of an internal combustion engine having vertically mounted through the cylinder head 10 thereof inlet valves 1 and 2 and exhaust valves 8 and 9. All the valves are controlled and actuated from a conventional camshaft arrangement 7 mounted across one side of the cylinders.

Thus inlet valves 1 and 2 are controlled in concert by the lever 5, actuated from the cams in conventional manner. Lever 5 controls the motion of rocker arms 3 and 4 which are pivoted together on a common shaft 21 with lever 5 so as to act in concert upon movement of lever 5.

Similarly outlet valves 8 and 9 are operated by rocker arms 11 and 12 pivoted together on a common shaft 22 with rocker arm 13, all of which are on the side of the cylinder opposite to the camshaft. The free end of rocker arm 13 is depressed in operation by the overlying free end of rocker arm 14, which is pivoted at 23 with lever 15 so as to act in concert therewith, but distinct from the common shaft 21 connecting rocker arms 3 and 4 with lever 5. Lever 15 is activated by camshaft 7 through cam follower thrust rod 6 to undergo vertical pivoting movement as controlled by the camshaft. It will be understood that a camshaft arrangement similar to 7 and 6 activates lever 5 from the same camshaft, although not shown in the drawing.

The free or inner ends of rocker levers 13 and 14 are to be pivotally connected. Were a common pivot used, however, the slightest misalignment of either shafts 22 or 23 or of the rocker levers themselves, either in assembly or in use, may cause substantial binding at the pivot between levers 13 and 14.

Accordingly, the following arrangement pivotally connects levers 13 and 14 in misalignment compensating manner.

Transversely across lever 13 is a race 18 of approximately semicircular cross-section, the axis of race 18 being substantially parallel to the axis of shaft 22. It should be noted that the depth $t$ of race 18 is slightly greater than the radius of curvature $r$ of the cross-section thereof.

A circular stud 16, one side of which has been slightly flattened to a planar configuration of a width less than the diameter of the stud, fits into race 18 in a manner admitting free turning of stud 16 within the race 18 about the axis thereof. Since, as above noted, race 18 is not exactly semicircular in cross-section, but the depth $t$ exceeds the radius of curvature $r$, the stud 16 is automatically retained within race 18 against being drawn upwardly out of the race in the position of Fig. 1.

The free end of rocker lever 14 includes in the surface thereof adjacent rocker lever 13 a somewhat similar race 19 of substantially the same cross-sectional configuration as the race 18. The longitudinal axis of race 19, however, is perpendicular to the axis of race 18. Another cylindrical stud 17, similar to stud 16, fits into race 19 in rocker lever 14. As with stud 16, stud 17 also has a longitudinal flattened planar portion on one side thereof, the width of which is less than the diameter of the stud. The length of stud 17, although being substantially greater than the diameter of stud 16, is less than the length of race 19. Thus stud 17, inserted in race 19, is free to rotate therein about its axis and slide longitudinally within the race 19 to a limited extent.

The two planar surfaces of studs 16 and 17 meet in use providing bearing surfaces therebetween. A pin 20, substantially perpendicular to the meeting planar faces of studs 16 and 17, joins the two studs.

Thus it will be seen that, upon rocking of lever 14 about its pivot 23, lever 13 will also be rocked about its pivot 22—i. e., in a vertical direction as shown in Fig. 1—with the inner end of lever 14 depressing the inner end of lever 13. During such action the bearing stud 16 will rotate about its longitudinal axis. Also during such movement, any misalignment between levers 13 and 14 in another direction will be compensated for by rotation of bearing stud 17 about its axis, and/or slight longitudinal sliding movements of stud 17 along race 19, and/or rotation of studs 16 and 17 with respect to each other about the axis of pin 20.

It will be understood that the pin 20 can be fitted into studs 16 and 17 either loosely or with a press fit, and serves as an axis of rotation therebetween as well as to maintain both studs 16 and 17 against longitudinal movement within the respective races sufficiently to admit of the studs coming out of the races. The desired pressure of forces acting on the bearing surfaces of the studs 16 and 17 are adjusted to the conditions involved in use by suitable choice of diameter and length of the studs.

Thus a simple and effective pivot construction is provided for lever linkages, such as that shown, in which two coacting levers are mutually pivoted for flexibility, ease of assembly, and freedom from binding, with great economy of parts and close tolerance assembly difficulties, and with compensation for misalignments in assembly or use.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a lever linkage of the character described in which the ends of two levers are mutually pivoted for limited movement, the combination which comprises two substantially cylindrical studs each having a flattened substantially planar surface along one side thereof, a race in each of said lever ends for receiving one of said studs, said races having substantially the same cross-sectional configuration as said studs, said studs being disposed in said races with their longitudinal axes substantially perpendicular and with said flattened planar surfaces in face-to-face relation, and means pivotally interconnecting said studs.

2. In a lever linkage of the character described in which the ends of two levers are mutually pivoted for limited movement in one plane, the combination which comprises two substantially cylindrical studs each having a flattened substantially planar surface along one side thereof, a race in each of said lever ends for receiving said studs, said races having substantially the same cross-sectional size and configuration as said studs and being disposed in said levers with their longitudinal axes substantially perpendicular, said studs being disposed in said races in face-to-face relation, and means pivotally interconnecting said studs through said adjacent planar surfaces and substantially perpendicular to the longitudinal axes of said studs.

3. In a lever linkage of the character described in which the ends of two levers are mutually pivoted for limited movement in substantially one plane, the combination which comprises two substantially cylindrical studs each having a flattened substantially planar surface along one side thereof, a race in each of said lever ends for receiving said studs, said races having substantially the same cross-sectional size and configuration as said studs and said studs and races being disposed in said levers with their longitudinal axes substantially perpendicular and with said flattened planar surfaces in face-to-face relation, and means pivotally interconnecting said studs through said planar surfaces thereof, one of said races being substantially longer than its respective said stud for limited sliding movement of said stud along said longer race.

4. In a lever linkage of the character described in which the ends of two levers are mutually pivoted for limited movement in one plane, the combination which comprises two substantially cylindrical studs each having a flattened substantially planar surface along one side thereof, a race in each of said lever ends for receiving said studs, said races having substantially the same cross-sectional size and configuration as said studs and said races and studs being disposed in said levers with their longitudinal axes substantially perpendicular and with said flattened planar surfaces in face-to-face relation, and means pivotally interconnecting said studs through said planar faces thereof, the depth of said races being greater than the radius of curvature of the cross-sections thereof.

5. In a lever linkage of the character described in which the ends of two levers are mutually pivoted for limited movement in one plane, the combination which comprises two substantially cylindrical studs each having a flattened substantially planar surface along one side thereof, a race in each of said lever ends for receiving said studs, said races having substantially the same cross-sectional size and configuration as said studs and said races and studs being disposed in said levers with their longitudinal axes substantially perpendicular and with said flattened planar surfaces in face-to-face relation, and means pivotally interconnecting said studs through said planar faces thereof, the depth of said races being greater than the radius of curvature of the cross-sections thereof and the width of said planar surfaces being less than the diameter of said studs.

6. In a valve actuating mechanism for internal combustion engines having a pair of opposed rocker levers pivoted at opposite ends for vertical movement with the free end of one said lever overlying the free end of the other said lever, the means for pivotally interconnecting said adjacent free ends of said rocker levers which comprises in combination a transverse race in the lower said rocker lever adjacent said free end thereof and having an approximately semicircular cross-section, the longitudinal axis of said race being substantially perpendicular to said rocker arm, a longitudinal race in the upper said rocker lever adjacent said free end thereof and having an approximately semicircular cross-section, the longitudinal axis of said longitudinal race being substantially perpendicular to the axis of said transverse race, a pair of substantially cylindrical studs fitting in said races for free rotational movement therein, a substantially planar flattened bearing surface along one side of each said stud, the width of each said bearing surface being substantially less than the diameter of said studs, and means for pivotally interconnecting said studs in said races with said bearing surfaces in face-to-face relation and with the longitudinal axes of said studs substantially perpendicular to each other.

7. In a valve actuating mechanism for internal combustion engines having a pair of opposed rocker levers pivoted at opposite ends for vertical movement with the free end of one said lever overlying the free ends of the other said lever, the means for pivotally interconnecting said adjacent free ends of said rocker levers which comprises in combination a transverse race in the lower said rocker lever adjacent said free end thereof and having an approximately semicircular cross-section, the longitudinal axis of said race being substantially perpendicular to said rocker lever, a longitudinal race in the upper said rocker lever adjacent said free end thereof and having an approximately semicircular cross-section, the longitudinal axis of said longitudinal race being substantially perpendicular to the axis of said transverse race and the depth of each said race being greater than the radius of curvature thereof, a pair of substantially cylindrical studs fitting in said races for free rotational movement therein, a substantially planar flattened bearing surface along one side of each said stud, the width of each said bearing surfaces being substantially less than the diameter of said studs, and means for pivotally interconnecting said studs in said races with said bearing surfaces in face-to-face relation and with the longitudinal axes of said studs substantially perpendicular to each other.

8. In a valve actuating mechanism for internal combustion engines having a pair of opposed rocker levers pivoted at opposite ends for vertical movement with the free end of one said lever overlying the free end of the other said lever, the means for pivotally interconnecting said adjacent free ends of said rocker levers which comprises in combination a transverse race in the lower said rocker lever adjacent said free end thereof and having an approximately semicircular cross-section, the longitudinal axis of said race being substantially perpendicular to said rocker lever, a longitudinal race in the upper said rocker lever adjacent said free end thereof and having an approximately semicircular cross-section, the longitudinal axis of said longitudinal race being substantially perpendicular to the axis of said transverse race, a pair of substantially cylindrical studs fitting in said race for free rotational movement therein, a substantially planar flattened bearing surface along one side of each said stud, the width of each said bearing surfaces being substantially less than the diameter of said studs, and means for pivotally interconnecting said studs in said races with said bearing surfaces in face-to-face relation and with the longitudinal axes of said studs substantially perpendicular to each other, the length of said studs being greater than the diameter thereof, and the length of said longitudinal race being substantially greater than the length of its respective stud.

9. In a lever linkage of the character described in which the ends of two levers are mutually pivoted for limited relative movement, the combination which comprises two substantially cylindrical bearings each having a flattened substantially planar portion along one side thereof, a race in each of said lever ends for receiving one of said studs, said races having substantially the same cross-sectional size and configuration as said studs for free rotating movement of said studs in said races about the longitudinal axis thereof, said studs being disposed in said races with their longitudinal axes substantially perpendicular and with said flattened planar surfaces in face-to-face relation, means pivotally interconnecting said studs through said planar faces thereof for pivoting movement therebetween about an axis substantially perpendicular to the longitudinal axes of said studs, one of said races being substantially longer than its respective stud for longitudinal sliding movement of said stud along said race, and the depth of both said races being greater than the radius of curvature thereof for retaining said studs therein against radially directed forces.

References Cited in the file of this patent

UNITED STATES PATENTS

| | | |
|---|---|---|
| 962,214 | Harrington | June 21, 1910 |
| 1,284,311 | Gilliard | Nov. 12, 1918 |
| 2,041,539 | Gaultier | May 19, 1936 |

FOREIGN PATENTS

| | | |
|---|---|---|
| 353,752 | Great Britain | July 30, 1931 |
| 199,563 | Switzerland | Nov. 16, 1938 |